US012373056B2

(12) United States Patent
Lee

(10) Patent No.: US 12,373,056 B2
(45) Date of Patent: Jul. 29, 2025

(54) MULTI-USER TOUCH DETECTION CIRCUIT AND DISPLAY DEVICE INCLUDING THE SAME

(71) Applicant: SAMSUNG DISPLAY CO., LTD., Yongin-si (KR)

(72) Inventor: Dong Chun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/597,054

(22) Filed: Mar. 6, 2024

(65) Prior Publication Data

US 2025/0077014 A1 Mar. 6, 2025

(30) Foreign Application Priority Data

Aug. 29, 2023 (KR) .................. 10-2023-0113964

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05); *G06F 2203/04104* (2013.01)

(58) Field of Classification Search
CPC ............ G06F 3/0416; G06F 3/0446; G06F 2203/04104
See application file for complete search history.

(56) References Cited

U.S. PATENT DOCUMENTS

| 8,410,794 B2* | 4/2013 | Nakayama ......... G01C 21/3664 |
| | | 345/173 |
| 10,222,912 B2* | 3/2019 | Hristov ................ G06F 3/0446 |
| 2002/0185999 A1* | 12/2002 | Tajima ................. G06F 3/0446 |
| | | 324/76.75 |
| 2004/0056758 A1* | 3/2004 | Schwartz ............... B60N 2/002 |
| | | 340/5.2 |

(Continued)

FOREIGN PATENT DOCUMENTS

| KR | 10-1898291 B1 | 9/2018 |
| KR | 10-2014273 B1 | 8/2019 |

(Continued)

*Primary Examiner* — Adam J Snyder
(74) *Attorney, Agent, or Firm* — F. CHAU & ASSOCIATES, LLC

(57) ABSTRACT

A touch detection circuit includes: a touch sensing unit including a plurality of driving electrodes and a plurality of sensing electrodes arranged to intersect the driving electrodes; first through n-th unique signal generators transmitting first through n-th unique signals, which have different voltage or current characteristics, to bodies of first through n-th users, respectively; at least one motion detection circuit detecting a touch direction and touch position of each of the first through n-th users; and a touch driving circuit driving the driving electrodes and the sensing electrodes to detect touch detection signals and generate touch position coordinate information, wherein the touch driving circuit selects any one user, of the first through n-th users, who performed a touch operation on the touch sensing unit according to a preset priority, and generates and outputs touch position coordinate information according to the touch position of the selected user.

20 Claims, 8 Drawing Sheets

(56) References Cited

U.S. PATENT DOCUMENTS

| | | | |
|---|---|---|---|
| 2006/0028453 A1* | 2/2006 | Kawabe | G06F 3/0488 345/173 |
| 2008/0133085 A1* | 6/2008 | Harumoto | B60W 40/08 701/36 |
| 2008/0186282 A1* | 8/2008 | Nix | G06F 3/0416 345/156 |
| 2008/0192024 A1* | 8/2008 | Mita | G06F 3/044 345/173 |
| 2009/0225036 A1* | 9/2009 | Wright | G06F 3/0443 345/173 |
| 2013/0304315 A1* | 11/2013 | Stoyanov | B60N 2/003 701/1 |
| 2014/0079285 A1* | 3/2014 | Yamashita | G06T 7/20 382/103 |
| 2015/0212584 A1* | 7/2015 | Aoyama | G06F 3/0416 345/173 |
| 2015/0253753 A1* | 9/2015 | Bennett | G06F 3/0488 700/83 |

FOREIGN PATENT DOCUMENTS

| | | | | |
|---|---|---|---|---|
| KR | 10-2020-0028497 | | 3/2020 | |
| WO | WO-2009010114 A1 | * | 1/2009 | ............ B60K 35/00 |
| WO | WO-2024041967 A1 | * | 2/2024 | ............ B60K 35/00 |

* cited by examiner

MULTI-USER TOUCH DETECTION CIRCUIT AND DISPLAY DEVICE INCLUDING THE SAME

This application claims priority under 35 U.S.C. § 119 to Korean Patent Application No. 10-2023-0113964 filed on Aug. 29, 2023 in the Korean Intellectual Property Office, the disclosure of which is incorporated by reference herein in its entirety.

TECHNICAL FIELD

Embodiments of the present invention relate to a touch detection circuit and a display device including the same.

DISCUSSION OF THE RELATED ART

As the information society continues to develop, demands for display devices, which display images, to be in various forms are increasing. For example, display devices are applied to various electronic devices such as smartphones, digital cameras, notebook computers, navigation devices, and smart televisions.

The display devices may be flat panel display devices such as liquid crystal display devices, field emission display devices, and organic light emitting display devices. Among these flat panel display devices, a light emitting display device generally includes a light emitting element that enables each pixel of a display panel to emit light by itself. Thus, the light emitting display device can display an image without a backlight unit that typically provides light to the display panel.

Recently, a display device includes a touch detection module (or touch detection circuit) for detecting a user's touch input (or, e.g., touch operation) as a form of a user interface. Generally, the touch detection module includes a touch sensing unit, in which touch electrodes are arranged, and a touch driving circuit, which detects a change in capacitance between the touch electrodes. The touch detection module may be mass-produced in a state in which it is formed integrally with an image display unit of a display device or mounted on the image display unit. However, when multiple users are providing touch inputs to the touch detection module, confusion and operation errors may occur in the display device.

SUMMARY

According to an embodiment of the present invention, a touch detection circuit includes: a touch sensing unit including a plurality of driving electrodes and a plurality of sensing electrodes arranged to intersect the driving electrodes; first through n-th unique signal generators transmitting first through n-th unique signals, which have different voltage or current characteristics, to bodies of first through n-th users, respectively; at least one motion detection circuit detecting a touch direction and touch position of each of the first through n-th users; and a touch driving circuit driving the driving electrodes and the sensing electrodes to detect touch detection signals and generate touch position coordinate information, wherein the touch driving circuit selects any one user, of the first through n-th users, who performed a touch operation on the touch sensing unit according to a preset priority, and generates and outputs touch position coordinate information according to the touch position of the selected user.

In an embodiment of the present invention, the first through n-th unique signal generators are installed on contact members that are adjacent to the first through n-th users, respectively, generate the first through n-th unique signals as electrical signals which are different in at least one current and voltage characteristic among amplitude, pulse width, wavelength and frequency, and transmit the first through n-th unique signals to the bodies of the first through n-th users, respectively.

In an embodiment of the present invention, the at least one motion detection circuit is installed on a display panel or a structure adjacent to the display panel, determines the touch direction and touch position of each of the first through n-th users according to motion detection directions and detection results of users who touch the touch sensing unit, and identifies and selects, from among identifications (IDs) of the first through n-th users, an ID and a motion detection signal of a user who performed a touch operation on the touch sensing unit according to the determination result.

In an embodiment of the present invention, the at least one motion detection circuit includes: at least one motion detection sensor detecting motion of the first through n-th users; and a sensor driving circuit unit identifying a motion detection signal for each of the first through n-th users according to the touch direction and touch position of each of the first through n-th users, and selecting and transmitting an ID and motion detection signal of a user who performed a touch operation on the touch sensing unit according to the identification result.

In an embodiment of the present invention, the touch driving circuit detects, in real time, at least one current and voltage characteristic among the frequency, pulse width, amplitude and current amount of a touch detection signal, compares the detected current and voltage characteristic with preset first through n-th reference current and voltage characteristic information, and identifies and determines any one user, of the first through n-th users, who performed the touch operation according to the comparison result.

In an embodiment of the present invention, the first through n-th reference current and voltage characteristic information includes first through n-th reference frequency information, first through n-th reference pulse width information, and first through n-th reference current amount information.

In an embodiment of the present invention, the touch driving circuit identifies and specifies any one user who performed the touch operation as a first user if the current and voltage characteristics of the touch detection signal are included in a range smaller than the first reference current and voltage characteristic information, identifies and specifies any one user who performed the touch operation as the second user if the current and voltage characteristics of the touch detection signal are included in a range equal to or greater than the first reference current and voltage characteristic information and smaller than the second reference current and voltage characteristic information, identifies and specifies any one user who performed the touch operation as the third user if the current and voltage characteristics of the touch detection signal are included in a range equal to or greater than the second reference current and voltage characteristic information and smaller than the third reference current and voltage characteristic information, and identifies and specifies any one user who performed the touch operation as the n-th user if the current and voltage characteristics of the touch detection signal are included in a range equal to or greater than the third reference current and voltage characteristic information and smaller than the n-th reference current and voltage characteristic information.

In an embodiment of the present invention, the touch driving circuit identifies and specifies at least one user, among the first through n-th users, who touched the touch sensing unit based on each user's ID and motion detection signal received from the at least one motion detection circuit, compares at least one user information identified and specified based on each user's ID with at least one user information identified by comparing the current and voltage characteristics of the touch detection signal with the first through n-th reference current and voltage characteristic information, calculates and selects touch position coordinate information for a user who matches the comparison result, and transmits the calculated and selected touch position coordinate information to a display driving circuit of the display panel.

In an embodiment of the present invention, the touch driving circuit calculates and selects the touch position coordinate information for the user and transmits the calculated and selected touch position coordinate information to the display driving circuit of the display panel only when at least one user information identified and specified based on each user's ID matches at least one user information identified by comparing the current and voltage characteristics of the touch detection signal.

In an embodiment of the present invention, when a plurality of users who simultaneously or successively touched the touch sensing unit are identified as a result of comparing the at least one user information, the touch driving circuit selects any one of the identified users according to preset priority information, calculates touch position coordinate information for only the priority user, and transmits the calculated touch position coordinate information to the display driving circuit.

According to an embodiment of the present invention, a display device includes: a display panel including a display area in which a plurality of pixels are arranged; and a touch detection circuit disposed on the display panel and detecting a user's touch, wherein the touch detection circuit includes: a touch sensing unit including a plurality of driving electrodes and a plurality of sensing electrodes arranged to intersect the driving electrodes; first through n-th unique signal generators transmitting first through n-th unique signals, which have different voltage or current characteristics, to bodies of first through n-th users, respectively; at least one motion detection circuit detecting a touch direction and touch position of each of the first through n-th users; and a touch driving circuit driving the driving electrodes and the sensing electrodes to detect touch detection signals and generate touch position coordinate information, wherein the touch driving circuit selects any one user, from the first through n-th users, who performed a touch operation on the touch sensing unit according to a preset priority, and generates and outputs touch position coordinate information according to the touch position of the selected user.

In an embodiment of the present invention, the first through n-th unique signal generators are installed on contact members that are adjacent to the first through n-th users, respectively, generate the first through n-th unique signals as electrical signals which are different in at least one current and voltage characteristic among amplitude, pulse width, wavelength and frequency, and transmit the first through n-th unique signals to the bodies of the first through n-th users, respectively.

In an embodiment of the present invention, the at least one motion detection circuit is installed on a display panel displaying an image or a structure around the display panel, determines the touch direction and touch position of each of the first through n-th users according to motion detection directions and detection results of users who touch the touch sensing unit, and identifies and selects, from among IDs of the first through n-th users, an ID and a motion detection signal of a user who performed a touch operation on the touch sensing unit according to the determination result.

In an embodiment of the present invention, the touch driving circuit detects, in real time, at least one current and voltage characteristic among the frequency, pulse width, amplitude and current amount of a touch detection signal, compares the detected current and voltage characteristic with preset first through n-th reference current and voltage characteristic information, and identifies and determines any one user, among the first through n-th users, who performed the touch operation according to the comparison result.

In an embodiment of the present invention, the touch driving circuit identifies and specifies at least one user who touched the touch sensing unit among the first through n-th users based on each user's ID and motion detection signal received from the at least one motion detection circuit, compares at least one user information identified and specified based on each user's ID with at least one user information identified by comparing the current and voltage characteristics of the touch detection signal with the first through n-th reference current and voltage characteristic information, calculates and selects touch position coordinate information for a user who matches the comparison result, and transmits the calculated and selected touch position coordinate information to a display driving circuit of the display panel.

According to an embodiment of the present invention, a touch detection circuit includes: a touch sensing unit including a plurality of driving electrodes and a plurality of sensing electrodes; first through n-th unique signal generators transmitting first through n-th unique signals, which have different voltage or current characteristics, to bodies of first through n-th users, respectively; at least one motion detection circuit detecting a touch direction and touch position of each of the first through n-th users who provide a touch input to the touch sensing unit; and a touch driving circuit measure a change in capacitance of touch nodes that are formed between driving electrodes and the sensing electrodes and generate touch position coordinate information, wherein the touch driving circuit selects any one user, of the first through n-th users, who provides a touch input on the touch sensing unit according to a preset priority, wherein the touch driving circuit detects a voltage and current characteristic of a touch detection signal in real time and compares the detected voltage and current characteristic with preset first through nth reference voltage and current characteristic information, and wherein the touch driving circuits identifies and determines any one user, among the first through nth users, who provided the touch input to the touch sensing unit according to the result of the comparison.

In an embodiment of the present invention, the first through n-th reference current and voltage characteristic information includes first through n-th reference frequency information, first through n-th reference pulse width information, and first through n-th reference current amount information.

In an embodiment of the present invention, the touch driving circuit identifies and specifies any one user who provided the touch input as a first user if the current and voltage characteristic of the touch detection signal are included in a range smaller than the first reference current and voltage characteristic information, identifies and specifies any one user who provided the touch input as the second user if the current and voltage characteristic of the touch detection signal are included in a range equal to or greater than the first reference current and voltage characteristic information and smaller than the second reference current and voltage characteristic information, identifies and specifies any one user who provided the touch input as the third user if the current and voltage characteristic of the touch detection signal are included in a range equal to or greater than the second reference current and voltage characteristic information and smaller than the third reference current and voltage characteristic information, and identifies and specifies any one user who provided the touch input as the n-th user if the current and voltage characteristic of the touch detection signal are included in a range equal to or greater than the third reference current and voltage characteristic information and smaller than the n-th reference current and voltage characteristic information.

In an embodiment of the present invention, the at least one motion detection circuit includes a motion detection sensor that detects the motion of each of the first through nth users who provides a touch input to the sensing unit and generates a motion detection signal according to motion detection direction and the detection result.

In an embodiment of the present invention, the at least one motion detection circuit further includes a sensor driving circuit that determines the touch direction and the touch position of each of the first through nth user according to the motion detection direction and the detection result of the motion detection signal that are detected through the motion detection sensor.

BRIEF DESCRIPTION OF THE DRAWINGS

The above and other features of the present invention will become more apparent by describing in detail embodiments thereof with reference to the attached drawings, in which.

DETAILED DESCRIPTION OF EMBODIMENTS

Figure 1:
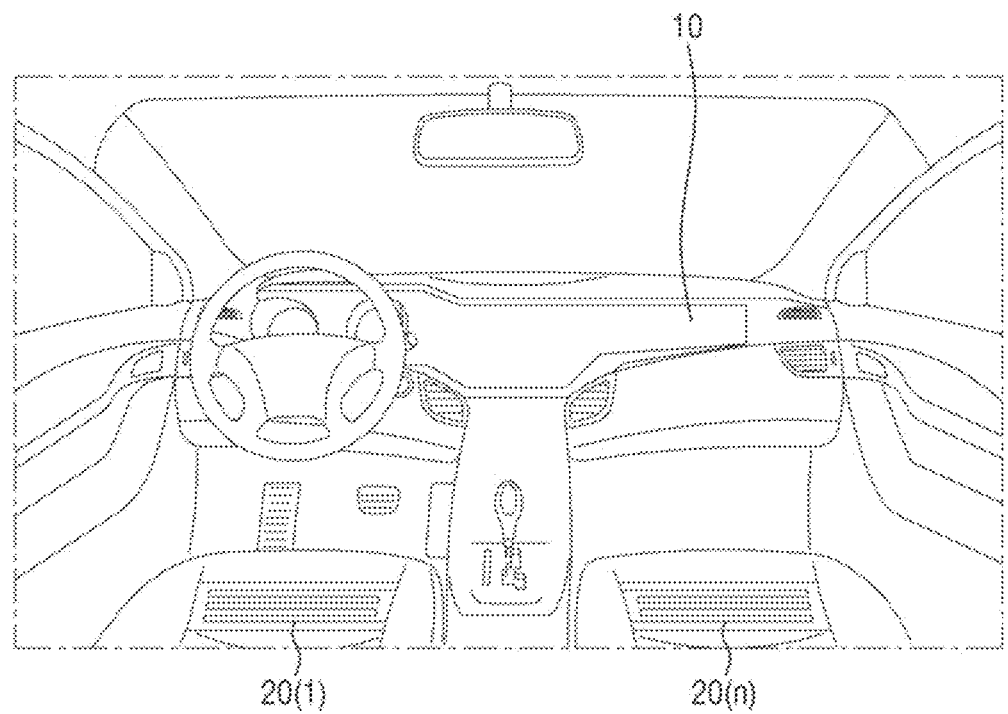
FIG. 1 illustrates an application of a large-screen display device according to an embodiment of the present invention.

The present invention will now be described more fully hereinafter with reference to the accompanying drawings. The embodiments of the present invention may, however, be embodied in different forms and should not be construed as limiting of the present invention.

It will also be understood that when a layer is referred to as being "on" another layer or substrate, it can be directly on the other layer or substrate, or intervening layers may also be present. The same reference numbers may indicate the same components throughout the specification and the drawings.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the present invention. Further, the blocks, units and/or modules of the embodiments may be physically combined into more complex blocks, units and/or modules without departing from the scope of the present invention.

Each of the features of the various embodiments of the present invention may be combined or combined with each other, in part or in whole, and technically various interlocking and driving are possible. Each embodiment may be implemented independently of each other or may be implemented together in association.

Hereinafter, embodiments of the present invention will be described with reference to the accompanying drawings.

FIG. 1 illustrates an application of a large-screen display device 10 according to an embodiment of the present invention.

Referring to FIG. 1, the display device 10 according to an embodiment of the present invention may be formed to have a large screen and may be applied to an instrument panel of a vehicle as well as to a center fascia and a center information display (CID) of a dashboard. The large-screen display device 10 may be formed as an integrated device that is connected from the instrument panel of the vehicle to a center dashboard and a passenger seat dashboard. For example, the display device 10 that is applied to the dashboard of the vehicle may display the vehicle's instrument information, navigation information, audio and video content information, air conditioning device control information, electronic control information for controlling options and functions, etc., in preset areas, respectively.

The large-screen display device 10 may be applied as a display unit of, for example, a television, a notebook computer, a PC monitor, a billboard, or an Internet of things (IoT) device. For another example, the display device 10 may be applied to portable electronic devices such as mobile phones, smartphones, tablet PCs, mobile communication terminals, electronic notebooks, electronic books, portable multimedia players (PMPs), and ultra-mobile PCs (UMPCs). In addition, the display device 10 may be applied to wearable devices such as smart watches, watch phones, glasses-type displays, and head mounted displays (HMDs).

The display device 10 according to an embodiment of the present invention may be variously classified according to a display method. For example, the display device 10 may be classified and configured as an organic light emitting display device, an inorganic electroluminescent (EL) display device, a quantum dot light emitting display device (QED), a micro-light emitting diode display device, a nano-light emitting diode display device, a plasma display panel (PDP), a field emission display (FED) device, a liquid crystal display (LCD) device, or an electrophoretic display (EPD) device. An organic light emitting display device will be described below as an example of the display device 10 according to an embodiment of the present invention. Unless a special distinction is required, the organic light emitting display device applied to embodiments of the present invention will be shortened to a display device 10. However, the display device 10 according to an embodiment of the present invention is not limited to the organic light emitting display device, and other display devices listed above or known in the art can also be applied within the scope sharing the technical spirit.

Figure 2:
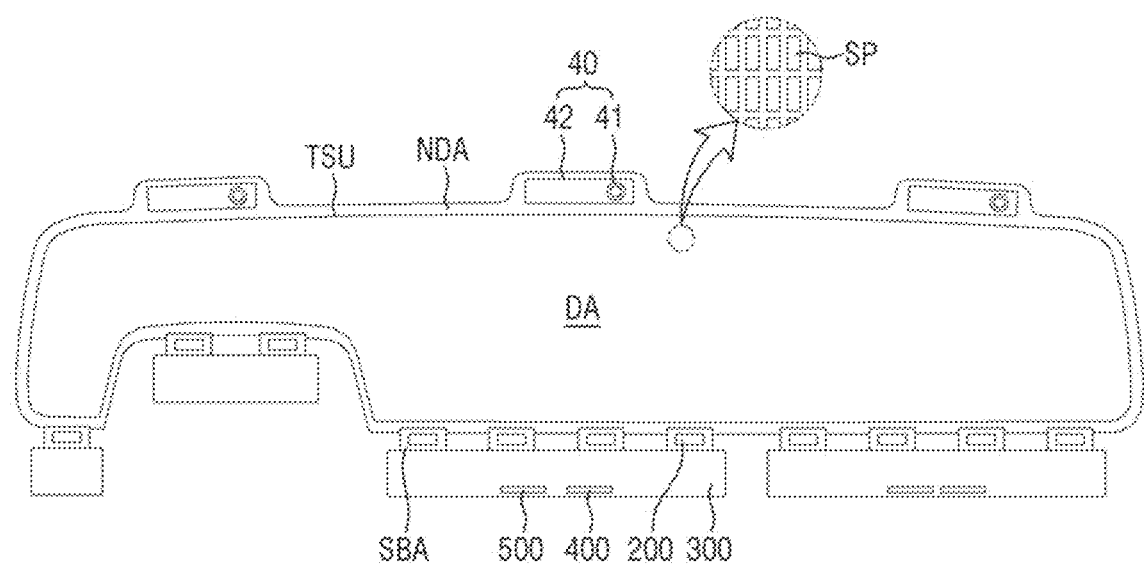
FIG. 2 is a plan view illustrating the configuration of a touch detection module and a display device according to an embodiment of the present invention.
Figure 3:
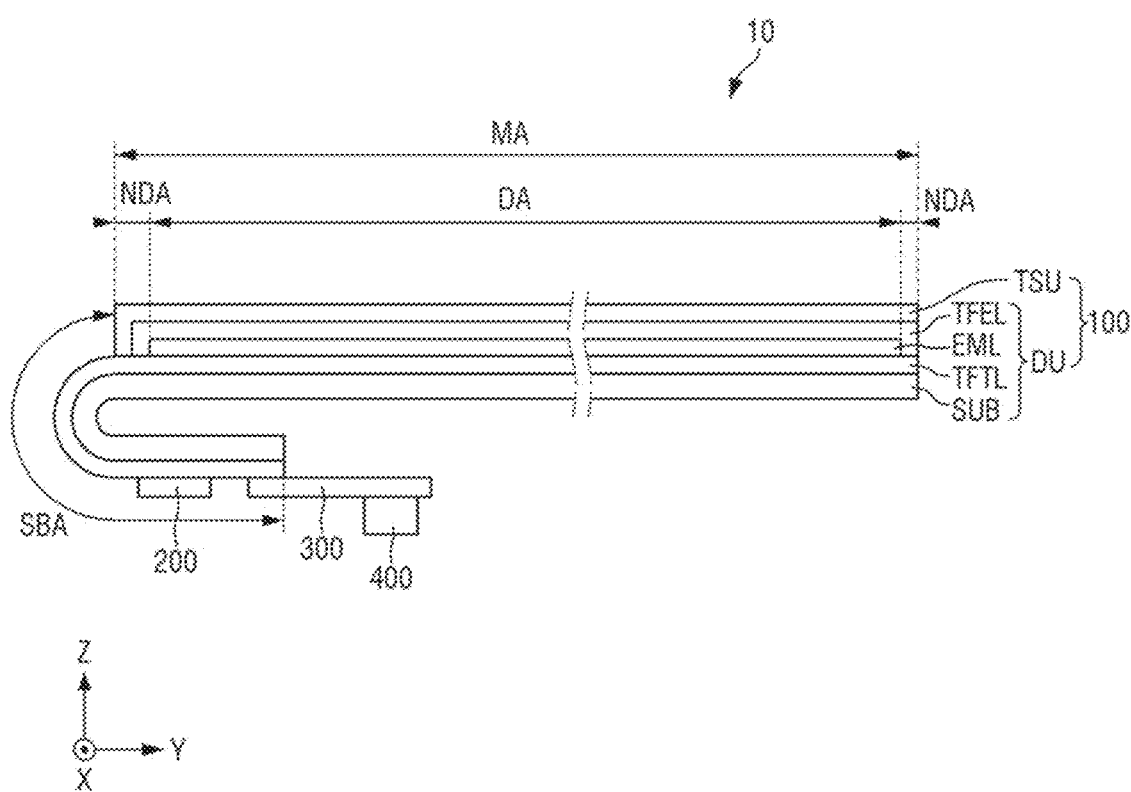
FIG. 3 is a cross-sectional view illustrating the side structure of the display device illustrated in FIG. 2.

FIG. 2 is a plan view illustrating the configuration of a touch detection module (or touch detection circuit) and a display device 10 according to an embodiment of the present invention. FIG. 3 is a cross-sectional view illustrating the side structure of the display device 10 illustrated in FIG. 2.

Referring to FIGS. 2 and 3, the display device 10 includes a display panel 100, display driving circuits 200, and the touch detection module. Here, the touch detection module includes a touch sensing unit TSU, first and $n^{th}$ unique signal generators 20(1) and 20($n$) (see FIG. 1), one or more motion detection modules 40 (or motion detection circuit), touch driving circuits 400, and motion detection driving circuits 500.

The display panel 100 of the display device 10 includes a display unit DU and a touch sensing unit TSU (or touch sensing circuit) (see FIG. 3). The display unit DU displays an image, and the touch sensing unit TSU detects touches of a human body part, such as a finger, and an electronic pen and is disposed on the display panel 100.

The display unit DU of the display panel 100 may include a plurality of subpixels SP and display an image through the subpixels SP. In addition, the touch sensing unit TSU of the display panel 100 may be mounted on the front of the display panel 100 or may be formed integrally with the display panel 100. The touch sensing unit TSU may include a plurality of touch electrodes and may detect a user's touch in a capacitive manner using the touch electrodes.

The display panel 100 may be divided into a main area MA and sub-areas SBA. The main area MA may include a display area DA, which has the subpixels SP for displaying an image, and a non-display area NDA, that is disposed around the display area DA. In the display area DA, light may be emitted from an emission area or opening area of each subpixel SP to display an image. For example, each subpixel SP of the display area DA may include a pixel circuit that includes switching elements, a pixel defining layer defining the emission area or the opening area, and a self-light emitting element.

The non-display area NDA may be an area outside the display area DA and may be adjacent to the display area DA. The non-display area NDA may be an edge area of the main area MA of the display panel 100. The non-display area NDA may include a gate driver supplying gate signals to gate lines and fan-out lines that connect the display driving circuits 200 and the display area DA.

The sub-areas SBA may extend from a side of the main area MA. The sub-areas SBA may include a flexible material that can be bent, folded, rolled, etc. For example, when the sub-areas SBA are bent, they may be overlapped by the main area MA in a thickness direction (Z-axis direction). Each of the sub-areas SBA may include a display driving circuit 200 and a pad unit connected to a circuit board 300. Optionally, the sub-areas SBA may be omitted, and the display driving circuits 200 and the pad units may be disposed in the non-display area NDA.

The circuit boards 300 may be attached onto the pad units of the display panel 100 by using an anisotropic conductive film (ACF). Lead lines of the circuit boards 300 may be electrically connected to the pad units of the display panel 100. For example, each of the circuit boards 300 may be a flexible printed circuit board, a printed circuit board, or a flexible film such as a chip on film.

The display driving circuits 200 may be formed as integrated circuits and mounted on the display panel 100 using a chip on glass (COG) method, a chip on plastic (COP) method, or an ultrasonic bonding method. For example, each of the display driving circuits 200 may be disposed in a sub-area SBA and may be overlapped by the main area MA in the thickness direction (Z-axis direction) by the bending of the sub-area SBA. For another example, the display driving circuits 200 may be mounted on the circuit boards 300.

Each of the display driving circuits 200 may operate as a main processor or may be formed integrally with the main processor. Accordingly, the display driving circuits 200 may control the overall function of the display device 10. For example, the display driving circuits 200 may output pixel driving signals and data voltages for driving the subpixels SP of the display unit DU. The display driving circuits 200 may supply data voltages to data lines to which the subpixels SP are connected. The display driving circuits 200 may supply power supply voltages to power lines of the display unit DU and may also supply gate control signals to a separate gate driver.

Each of the display driving circuits 200 may receive touch data from a touch driving circuit 400, determine coordinates of a user's touch, and then generate digital video data according to the touch coordinates. For example, each of the display driving circuits 200 may execute an application indicated by an icon displayed at the user's touch coordinates. For another example, each of the display driving circuits 200 may receive coordinate data from an electronic pen, determine touch coordinates of the electronic pen, and then generate digital video data according to the touch coordinates or execute an application indicated by an icon displayed at the touch coordinates of the electronic pen.

First through $n^{th}$ unique signal generators (20(1) and 20($n$) in FIG. 1) transmit different unique current signals to users who simultaneously use the display device 10. For example, the first through $n^{th}$ unique signal generators (20(1) and 20($n$) in FIG. 1) may be respectively installed on at least one contact member around first through $n^{th}$ users who simultaneously use the display device 10, such as seats, belts, armrests, or clothes of the first through n$^{th}$ users, and may transmit different unique current signals to the bodies of the first through n$^{th}$ users.

For example, the first unique signal generator 20(1) may transmit a first unique signal to the body of the driver of a vehicle, and the second unique signal generator may transmit a second unique signal to a back seat passenger. In addition, the third unique signal generator may transmit a third unique signal to another back seat passenger, and the n$^{th}$ unique signal generator may transmit an n$^{th}$ unique signal to a front seat passenger.

The first through n$^{th}$ unique signals respectively generated and output from the first through n$^{th}$ unique signal generators (20(1) and 20(n) in FIG. 1) may be electrical signals that are different in at least one voltage and/or current characteristic among amplitude, pulse width, wavelength, and frequency.

Referring to FIG. 2, the motion detection modules 40 are mounted and disposed in the non-display area NDA of the display panel 100 to detect touch directions and touch positions of users who touch the display panel 100, and the touch directions and touch positions are determined with the touch sensing unit TSU of the display panel 100. The motion detection modules 40 may also be installed separately from the display panel 100 on a surrounding structure such as a case or dashboard where the display panel 100 is installed.

The motion detection modules 40 detect the touch directions and touch positions of the first through n$^{th}$ users who touch the touch sensing unit TSU of the display panel 100 and generate motion detection signals for the first through n$^{th}$ users, respectively. In addition, each of the motion detection modules 40 includes at least one motion detection sensor 41 and a sensor driving circuit unit 42 (or sensor driving circuit).

The motion detection sensor 41 detects the motion of each of the first through n$^{th}$ users who touch the touch sensing unit TSU of the display panel 100 and generates a motion detection signal according to the motion detection direction and detection result. The motion detection sensor 41 is a human body detection sensor for detecting a user's touch and may include at least one short-range motion detection sensor such as an infrared sensor or a hovering detection sensor. The motion detection sensor 41 may be disposed in the non-display area NDA of the display panel 100 or may be installed separately from the display panel 100 on a surrounding structure such as a case or dashboard where the display panel 100 is installed.

The sensor driving circuit unit 42 determines the touch direction and touch position of each of the first through n$^{th}$ user according to the motion detection direction and detection result of a motion detection signal detected through the motion detection sensor 41. Then, an ID and a motion detection signal of each of the first through n$^{th}$ user are identified based on the determination result, and the identified ID and motion detection signal of each user are transmitted to a motion detection driving circuit 500.

Each of the motion detection driving circuits 500 may be formed in the form of an integrated circuit and mounted on a separate circuit board 300. Each of the motion detection driving circuits 500 may be electrically connected to the sensor driving circuit unit 42.

Each of the motion detection driving circuit 500 transmits a driving control signal to the sensor driving circuit unit 42 to control the driving timing of the motion detection sensor 41 and the sensor driving circuit unit 42. Each of the motion detection driving circuits 500 stores, in real time, an ID and a motion detection signal, which are for each user, that are received from the sensor driving circuit unit 42 and transmits and shares them to a touch driving circuit 400.

Each of the touch driving circuits 400 may be mounted on a separate circuit board 300. The touch driving circuits 400 may be electrically connected to the touch sensing unit TSU. For example, the touch driving circuit 400 may overlap the main area MA. The touch driving circuits 400 may be formed as integrated circuits. As described above, the touch driving circuits 400 transmit touch driving signals to the touch electrodes of the touch sensing unit TSU. Here, each of the touch driving signals may be a pulse signal having a predetermined frequency. The touch driving circuits 400 measure, in real time, a change in charge of mutual capacitance of each of a plurality of touch nodes formed by the touch electrodes. For example, the touch driving circuits 400 measure changes in capacitances of the touch nodes according to changes in the frequency, voltage magnitude, and current amount of touch detection signals received through the touch electrodes. In this way, the touch driving circuits 400 can determine whether a user's touch has occurred and whether the user is in proximity according to the change in charge of mutual capacitance of each of the touch nodes.

The touch driving circuits 400 calculate the occurrence of a touch input by a user's body part such as a finger and determines coordinates of the touch input based on a change in capacitance between the touch electrodes. In addition, the touch driving circuits 400 detect at least one voltage characteristic or current characteristic among the frequency, voltage magnitude (e.g., pulse width and amplitude), and current amount of a touch detection signal in real time and compare the detected voltage characteristic or current characteristic with preset first through n$^{th}$ reference voltage characteristic or current characteristic information. The first through n$^{th}$ reference voltage characteristic and current characteristic information may include characteristic information such as first through n$^{th}$ reference frequencies, first through n$^{th}$ reference voltage magnitudes (e.g., reference pulse widths and reference amplitudes), and first through n$^{th}$ reference current amounts. The touch driving circuits 400 identify and specify any one user who touched the touch sensing unit TSU among the first through n$^{th}$ users according to the result of comparing the current characteristics of a touch detection signal that are detected in real time with the first through n$^{th}$ reference current characteristic information. For example, the touch driving circuits 400 may identify and select a user who touched the touch sensing unit TSU as the driver or the front seat passenger.

When a plurality of users among the first through n$^{th}$ users who simultaneously share and use the display device 10 touch the touch sensing unit TSU simultaneously or successively, the touch driving circuits 400 compare current characteristics of each of a plurality of touch detection signals that are detected simultaneously or successively with the first through n$^{th}$ reference current characteristic information. Then, the touch driving circuits 400 identify and specify a plurality of users who simultaneously or successively touched the touch sensing unit TSU according to the comparison result.

When a plurality of users who simultaneously or successively touched the touch sensing unit TSU are identified among the first through n$^{th}$ users, the touch driving circuits 400 calculate touch coordinates of only one of the identified users according to preset priority information and transmit the calculated touch coordinates to the display driving circuits 200. For example, when a plurality of users who simultaneously or successively touched the touch sensing unit TSU are identified as the driver and the front seat passenger, the touch driving circuits 400 may select or calculate the driver's touch coordinates according to the preset priority information and transmit the selected or calculated touch coordinates to the display driving circuits 200.

In addition, the touch driving circuits 400 receive an ID and a motion detection signal for each user from the motion detection driving circuits 500 in real time. The touch driving circuits 400 may identify and specify at least one user who touched the touch sensing unit TSU among the first through $n^{th}$ users based on the received ID and the motion detection signal of each user.

The touch driving circuits 400 compare at least one user information identified and specified based on the ID and motion detection signal of each user with at least one user information identified and specified by comparing the current characteristics of a touch detection signal with the first through $n^{th}$ reference current characteristic information. Then, touch coordinates of a user who matches the comparison result may be selected or calculated and transmitted to the display driving circuits 200.

In addition, when a plurality of users who simultaneously or successively touched the touch sensing unit TSU are identified as a result of comparing at least one user information, the touch driving circuits 400 may calculate touch coordinates of only one of the identified users according to preset priority information and transmit the calculated touch coordinates to the display driving circuits 200.

In addition, when a user, who is identified and specified by comparing the current characteristics of a touch detection signal with the first through $n^{th}$ reference current characteristic information, is different from a user, who is identified and specified based on the ID and motion detection signal of each user, it may be suspected that a malfunction has occurred, for example, a passenger that is adjacent to the driver's seat has touched the touch sensing unit TSU. Accordingly, only when a user, who is identified and specified by comparing the current characteristics of a touch detection signal with the first through $n^{th}$ reference current characteristic information, matches a user, who is identified and specified based on the ID and motion detection signal of each user, can touch coordinates of the user who has made a touch input be selected and calculated and transmitted to the display driving circuits 200. The detailed configuration and operating characteristics of the touch driving circuits 400 will be described in more detail later.

In addition, a substrate SUB of the display panel 100 illustrated in FIG. 3 may be a base substrate or a base member. The substrate SUB may be a flexible substrate that can be bent, folded, rolled, etc. For example, the substrate SUB may include a glass material or a metal material. However, the present invention is not limited thereto. For another example, the substrate SUB may include polymer resin such as polyimide (PI).

A thin-film transistor layer TFTL may be disposed on the substrate SUB. The thin-film transistor layer TFTL may include a plurality of thin-film transistors constituting the pixel circuits of the subpixels SP. The thin-film transistor layer TFTL may further include gate lines, data lines, power lines, gate control lines, fan-out lines connecting the display driving circuits 200 and the data lines to each other, and lead lines connecting the display driving circuits 200 and the pad units to each other. When a gate driver 210 is formed on a side of the non-display area NDA of the display panel 100, it may also include thin-film transistors.

The thin-film transistor layer TFTL may be disposed in the display area DA, the non-display area NDA, and the sub-areas SBA. The thin-film transistors of the pixels, the gate lines, the data lines, and the power lines of the thin-film transistor layer TFTL may be disposed in the display area DA. The gate control lines and the fan-out lines of the thin-film transistor layer TFTL may be disposed in the non-display area NDA. The lead lines of the thin-film transistor layer TFTL may be disposed in the sub-areas SBA.

A light emitting element layer EML may be disposed on the thin-film transistor layer TFTL. The light emitting element layer EML may include a plurality of light emitting elements, each including a first electrode, a light emitting layer and a second electrode to emit light, and a pixel defining layer. For example, the pixel defining layer is disposed on a portion of the first electrode and includes an opening exposing a portion of the first electrode, and the light emitting layer and second electrode are disposed on the first electrode in the opening of the pixel defining layer. The light emitting elements of the light emitting element layer EML may be disposed in the display area DA.

An encapsulation layer TFEL may cover upper and side surfaces of the light emitting element layer EML and may protect the light emitting element layer EML. The encapsulation layer TFEL may include at least one inorganic layer and at least one organic layer to encapsulate the light emitting element layer EML.

The touch sensing unit TSU may be disposed on the encapsulation layer TFEL. The touch sensing unit TSU may include a plurality of touch electrodes, which are for detecting a user's touch in a capacitive manner, and touch lines, which connect the touch electrodes and the touch driving circuits 400. For example, the touch sensing unit TSU may sense a user's touch using a self-capacitance method or a mutual capacitance method.

For another example, the touch sensing unit TSU may be disposed on a separate substrate that is disposed on the display unit DU. In this case, the substrate that supports the touch sensing unit TSU may be a base member that encapsulates the display unit DU.

The touch electrodes included in the touch sensing unit TSU may be disposed in a touch sensor area that overlaps the display area DA. The touch lines of the touch sensing unit TSU may be disposed in a touch peripheral area that overlaps the non-display area NDA.

Figure 4:
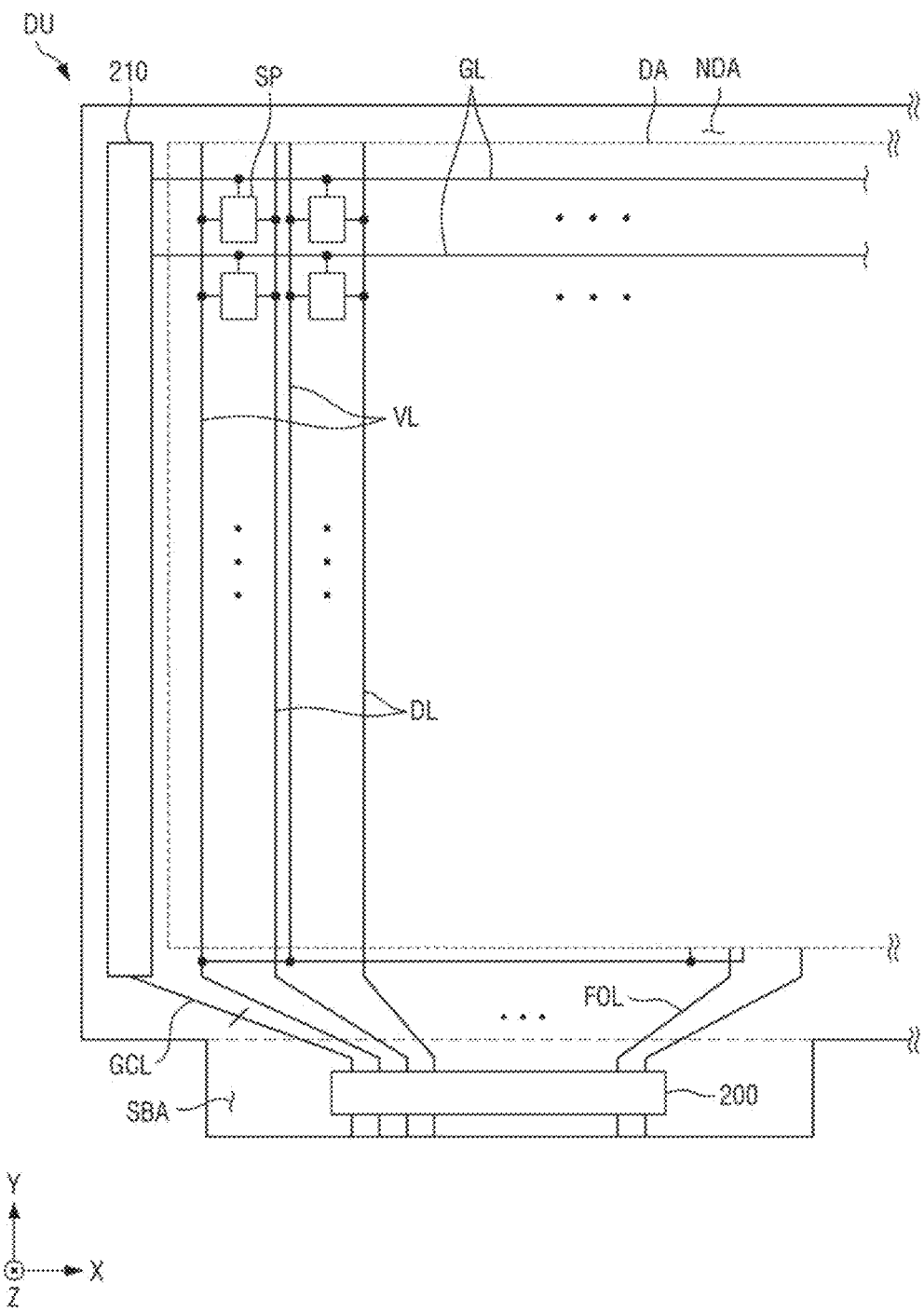
FIG. 4 is a layout view schematically illustrating the structure of a display panel illustrated in FIGS. 2 and 3.

FIG. 4 is a layout view schematically illustrating the structure of the display panel 100 illustrated in FIGS. 2 and 3. Specifically, FIG. 4 is a layout view illustrating the display area DA and the non-display area NDA of the display unit DU before the touch sensing unit TSU is formed.

The display area DA is an area that displays an image and may be a central area of the display panel 100. The display area DA may include a plurality of subpixels SP, a plurality of gate lines GL, a plurality of data lines DL, and a plurality of power lines VL. For example, the plurality of subpixels SP, the plurality of gate lines GL, the plurality of data lines DL, and the plurality of power lines VL may be disposed in the display area DA. For example, each of the subpixels SP may be a minimum unit that outputs light.

The gate lines GL may supply gate signals that are received from the gate driver 210 in the non-display area NDA to the subpixels SP. The gate lines GL may extend in an X-axis direction and may be spaced apart from each other in a Y-axis direction that intersects the X-axis direction.

The data lines DL may supply data voltages that are received from a display driving circuit 200 to the subpixels SP. The data lines DL may extend in the Y-axis direction and may be spaced apart from each other in the X-axis direction.

The power lines VL may supply a power supply voltage received from the display driving circuit 200 to the subpixels SP. Here, the power supply voltage may be at least one of a driving voltage, an initialization voltage, and/or a reference voltage. The power lines VL may extend in the Y-axis direction and may be spaced apart from each other in the X-axis direction.

The non-display area NDA may at least partially the display area DA. The non-display area NDA may include the gate driver 210, fan-out lines FOL, and gate control lines GCL. For example, the gate driver 210, the fan-out lines FOL, and the gate control lines GCL may be disposed in the non-display area NDA. The gate driver 210 may generate a plurality of gate signals based on a gate control signal and may sequentially supply the gate signals to the gate lines GL in a set order.

The fan-out lines FOL may extend from the display driving circuit 200 to the display area DA. The fan-out lines FOL may supply data voltages, which are received from the display driving circuit 200, to the data lines DL.

The gate control lines GCL may extend from the display driving circuit 200 to the gate driver 210. The gate control lines GCL may supply gate control signals, which are received from the display driving circuit 200, to the gate driver 210.

The display driving circuit 200 may output signals and voltages for driving the display panel 100 to the fan-out lines FOL. The display driving circuit 200 may supply data voltages to the data lines DL through the fan-out lines FOL. The data voltages may be supplied to the subpixels SP and may determine luminances of the subpixels SP. The display driving circuit 200 may supply gate control signals to the gate driver 210 through the gate control lines GCL.

Figure 5:
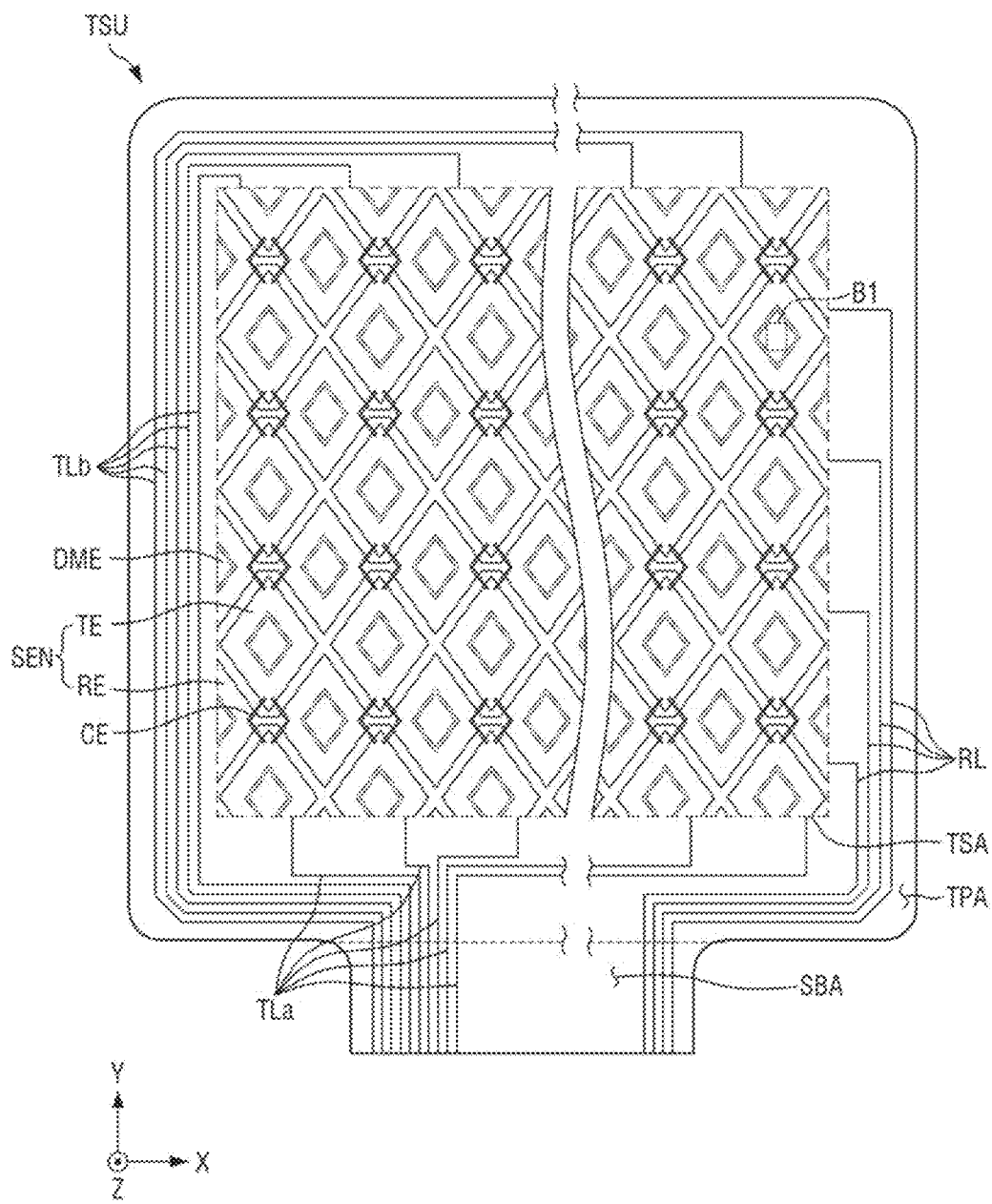
FIG. 5 is a layout view schematically illustrating the touch detection module illustrated in FIGS. 2 and 3.

FIG. 5 is a layout view schematically illustrating the touch detection module illustrated in FIGS. 2 and 3.

In FIG. 5, touch electrodes SEN of the main area MA include two types of electrodes, for example, driving electrodes TE and sensing electrodes RE. In addition, the touch electrodes SEN are driven by using a mutual capacitance method in which touch driving signals are transmitted to the driving electrodes TE, and then a change in charge of mutual capacitance of each of a plurality of touch nodes is detected through the sensing electrodes RE. The above case will be described below as an example, but the mutual capacitance driving method is not limited thereto.

In FIG. 5, only some of the touch electrodes SEN composed of the driving electrodes TE and the sensing electrodes RE, dummy patterns DME, and touch lines TLa, TLb and RL are illustrated for ease of description. The present invention is not limited to the number of driving electrodes TE, sensing electrodes RE, dummy patterns DME, and touch lines TLa, TLb, and RL illustrated in FIG. 5.

The main area MA of the touch sensing unit TSU includes a touch sensing area TSA, which is for detecting a user's touch, and a touch peripheral area TPA, which is disposed adjacent to the touch sensing area TSA. The touch sensing area TSA may overlap the display area DA of FIGS. 1 through 3, and the touch peripheral area TPA may overlap the non-display area NDA.

The driving electrodes TE, the sensing electrodes RE, and the dummy patterns DME are disposed in the touch sensing area TSA. The driving electrodes TE and the sensing electrodes RE may be electrodes for forming mutual capacitance therebetween to detect a touch of an object or a user.

The sensing electrodes RE may be arranged side by side in a first direction (X-axis direction) and a second direction (Y-axis direction). The sensing electrodes RE may be electrically connected to each other in the first direction (X-axis direction). The sensing electrodes RE adjacent to each other in the first direction (X-axis direction) may be connected to each other. The sensing electrodes RE adjacent to each other in the second direction (the Y-axis direction) may be electrically isolated from each other. The sensing electrodes RE adjacent to each other in the second direction (the Y-axis direction) may be separated from each other. Accordingly, a touch node having mutual capacitance may be disposed at each of the intersections between the driving electrodes TE and the sensing electrodes RE. The touch nodes may correspond to the intersections of the driving electrodes TE and the sensing electrodes RE.

The driving electrodes TE may be arranged side by side in the first direction (X-axis direction) and the second direction (Y-axis direction). The driving electrodes TE adjacent to each other in the first direction (X-axis direction) may be electrically isolated from each other. The driving electrodes TE may be electrically connected to each other in the second direction (Y-axis direction). The driving electrodes TE adjacent to each other in the second direction (Y-axis direction) may be connected to each other through a separate connection electrode CE.

Each of the dummy patterns DME may be surrounded by a driving electrode TE or a sensing electrode RE. Each of the dummy patterns DME may be electrically isolated from the driving electrode TE and/or the sensing electrode RE. Each of the dummy patterns DME may be spaced apart from the driving electrode TE and/or the sensing electrode RE. Each of the dummy patterns DME may be electrically floating.

Although each of the driving electrodes TE, the sensing electrodes RE, and the dummy patterns DME has a rhombic planar shape in FIG. 5, the present invention is not limited thereto. For example, each of the driving electrodes TE, the sensing electrodes RE, and the dummy patterns DME may also be shaped like a quadrilateral other than a rhombus. In addition, each of the driving electrodes TE, the sensing electrodes RE, and the dummy patterns DME may have a polygon shape other than a quadrilateral. Further, each of the driving electrodes TE, the sensing electrodes RE, and the dummy patterns DME may have a circular shape or an oval shape in a plan view.

The touch lines TLa, TLb and RL may be disposed in the touch sensor peripheral area TPA. The touch lines TLa, TLb and RL include first and second touch driving lines TLa and TLb, which are connected to the driving electrodes TE, and touch sensing lines RL, which are connected to the sensing electrodes RE.

The sensing electrodes RE that are disposed at an end of the touch sensing area TSA may be connected one-to-one to the touch sensing lines RL. For example, rightmost sensing electrodes RE among the sensing electrodes RE, which are electrically connected to each other in the first direction (X-axis direction), may be respectively connected to the touch sensing lines RL as illustrated in FIG. 5. In addition, each of the touch sensing lines RL may be electrically connected to a touch driving circuit 400 through a separate pad unit.

The driving electrodes TE disposed at a first end of the touch sensing area TSA may be connected one-to-one to the first touch driving lines TLa, and the driving electrodes TE disposed at a second end of the touch sensing area TSA may be connected one-to-one to the second touch driving lines TLb. For example, lowermost driving electrodes TE among the driving electrodes TE, which are electrically connected to each other in the second direction (Y-axis direction), may be connected to the first touch driving lines TLa, respectively, and uppermost driving electrodes TE may be connected to the second touch driving lines TLb, respectively. The second touch driving lines TLb may pass a left side of the touch sensing area TSA and then may be connected to the driving electrodes TE on an upper side of the touch sensing area TSA.

The driving electrodes TE are connected to the first and second touch driving lines TLa and TLb on two sides of the touch sensing area TSA to receive touch driving signals.

Therefore, it is possible to prevent a difference between touch driving signals, which are transmitted to the driving electrodes TE disposed on a lower side of the touch sensing area TSA, and touch driving signals, which are transmitted to the driving electrodes TE disposed on the upper side of the touch sensing area TSA from occurring due to the resistive-capacitive (RC) delay of the touch driving signals.

Figure 6:
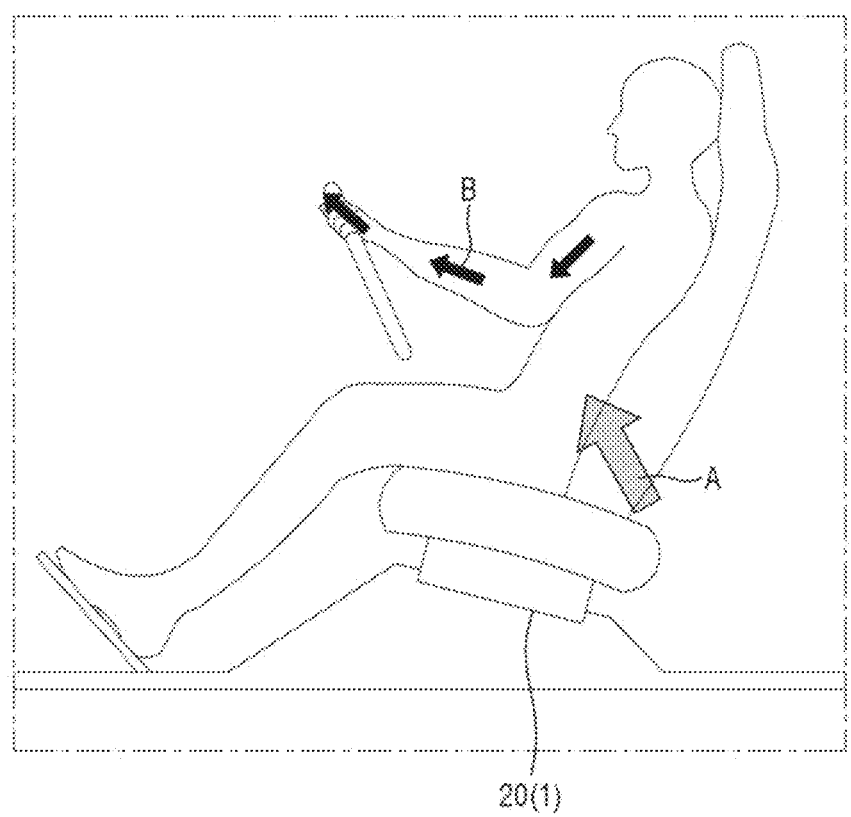
FIG. 6 illustrates a first unique signal generator and a first unique signal transmission path of the touch detection module according to an embodiment of the present invention.

FIG. 6 illustrates a first unique signal generator and a first unique signal transmission path of the touch detection module according to an embodiment of the present invention. In addition, FIG. 7 is a waveform diagram of first and $n^{th}$ unique signals of first and $n^{th}$ unique signal generators.

Figure 7:
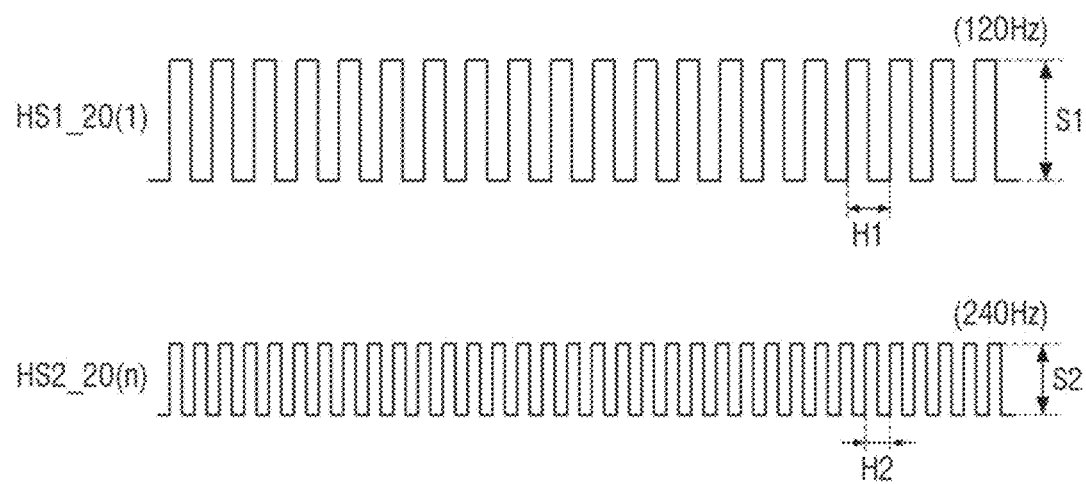
FIG. 7 is a waveform diagram of first and $n^{th}$ unique signals of first and $n^{th}$ unique signal generators.

Referring to FIGS. 6 and 7, first through $n^{th}$ unique signal generators (20(1) and 20($n$) in FIG. 1) transmit different unique current signals, that is, first through $n^{th}$ unique signals (HS1_20(1) and HS2_20($n$)) to different users who simultaneously use the display device 10.

The first unique signal generator 20(1) may be installed on at least one contact member adjacent to a first user who uses the display device 10, and may transmit the first unique signal HS1_20(1) to the body of the first user. For example, a contact member may include a seat, a belt, an armrest, and clothes of the first user. In addition, the $n^{th}$ unique signal generator 20($n$) may transmit the $n^{th}$ unique signal HS2_20($n$) to a front seat passenger.

The first through $n^{th}$ unique signals (HS1_20(1) and HS2_20($n$)) respectively generated and output from the first through $n^{th}$ unique signal generators (20(1) and 20($n$) in FIG. 1) may be current signals that are different in at least one current characteristic among amplitude, pulse width, wavelength, and frequency.

For example, the frequency (120 Hz), amplitude (S1), pulse width (H1) and current amount of the first unique signal HS1_20(1) may be lower, smaller, or less than the frequency, amplitude, pulse width and current amount of the second unique signal. In addition, the frequency, amplitude, pulse width and current amount of the second unique signal may be higher, larger, or greater than the frequency (120 Hz), amplitude (S1), pulse width (H1) and current amount of the first unique signal HS1_20(1). In addition, the frequency, amplitude, pulse width and current amount of the third unique signal may be higher, larger, or greater than the frequency, amplitude, pulse width and current amount of the second unique signal. In addition, the frequency (240 Hz), amplitude (S2), pulse width (H2) and current amount of the $n^{th}$ unique signal HS2_20($n$) may be higher, larger, or greater than the frequency, amplitude, pulse width and current amount of the third unique signal.

The first unique signal HS1_20(1) generated from the first unique signal generator 20(1) is supplied and transmitted from the first unique signal generator 20(1) to the body of the first user as indicated by arrows A and B in the drawing. When the first user touches the touch sensing unit TSU, the first unique signal HS1_20(1) is transmitted to the driving electrodes TE and the sensing electrodes RE of the touch sensing unit TSU and to the touch nodes at the intersections of the driving electrodes TE and the sensing electrodes RE. Therefore, the capacitances of the touch nodes are changed by the current characteristics of the first unique signal HS1_20(1), that is, the frequency (120 Hz), amplitude (S1), pulse width (H1) and current amount of the first unique signal HS1_20(1).

In addition, the $n^{th}$ unique signal HS2_20($n$) generated from the $n^{th}$ unique signal generator 20($n$) is supplied and transmitted to the body of an $n^{th}$ user. When the $n^{th}$ user touches the touch sensing unit TSU, the $n^{th}$ unique signal HS2_20($n$) is transmitted to the driving electrodes TE and the sensing electrodes RE of the touch sensing unit TSU and to the touch nodes at the intersections of the driving electrodes TE and the sensing electrodes RE. In this case, the capacitances of the touch nodes are changed by the current characteristics of the $n^{th}$ unique signal HS2_20($n$), that is, the frequency (240 Hz), amplitude (S2), pulse width (H2) and current amount of the $n^{th}$ unique signal HS2_20($n$).

When detecting a touch, a touch driving circuit 400 receives a touch detection signal whose voltage and current characteristics vary according to a change in capacitance of each of the touch nodes that are formed in the touch sensing unit TSU. Then, the touch driving circuit 400 calculates the occurrence of a touch input by a user's body part, such as a finger, and coordinates of the touch input based on the change in capacitance of the touch nodes.

Here, to specify users who touched the touch sensing unit TSU, the touch driving circuit 400 detects at least one current characteristic among the frequency, amplitude, pulse width, and current amount of the touch detection signal in real time and compares the detected current characteristic with preset first through $n^{th}$ reference current characteristic information. As described above, the first through $n^{th}$ reference current characteristic information includes characteristic information such as first through $n^{th}$ reference frequencies, first through $n^{th}$ reference voltage magnitudes (e.g., amplitudes and pulse widths), and first through $n^{th}$ reference current amounts.

The touch driving circuit 400 identifies and specifies any one user who touched the touch sensing unit TSU among the first through $n^{th}$ users based on the result of comparing the current characteristics of a touch detection signal detected in real time with the first through $n^{th}$ reference current characteristic information.

For example, if the current and voltage characteristic information (e.g., frequency, amplitude, and pulse width information) of a touch detection signal that is detected in real time is included in a range smaller (e.g., less) than the first reference current and voltage characteristic information (e.g., first reference frequency, first reference amplitude, and first reference pulse width), the touch driving circuit 400 may identify and specify a user who touched the touch sensing unit TSU as the driver who is the first user. However, if the current and voltage characteristic information (frequency, amplitude, and pulse width information) of the touch detection signal detected in real time is included in a range equal to or greater than the first reference current and voltage characteristic information and smaller than the second reference current and voltage characteristic information (e.g., second reference frequency, second reference amplitude, and second reference pulse width), the touch driving circuit 400 may identify and specify a user who touched the touch sensing unit TSU as a back seat passenger who is the second user.

In addition, if the current and voltage characteristic information of the touch detection signal detected in real time is included in a range equal to or greater than the second reference current and voltage characteristic information and smaller than the third reference current and voltage characteristic information (e.g., third reference frequency, third reference amplitude, and third reference pulse width), the touch driving circuit 400 may identify and specify a user who touched the touch sensing unit TSU as another back seat passenger who is the third user. However, if the current and voltage characteristic information (e.g., frequency, amplitude, and pulse width information) of the touch detection signal detected in real time is included in a range equal to or greater than the third reference current and voltage characteristic information and smaller than the $n^{th}$ reference current and voltage characteristic information (e.g., $n^{th}$ reference frequency, $n^{th}$ reference amplitude, and $n^{th}$ reference pulse width), the touch driving circuit 400 may identify and specify a user who touched the touch sensing unit TSU as the front seat passenger who is the $n^{th}$ user.

Figure 8:
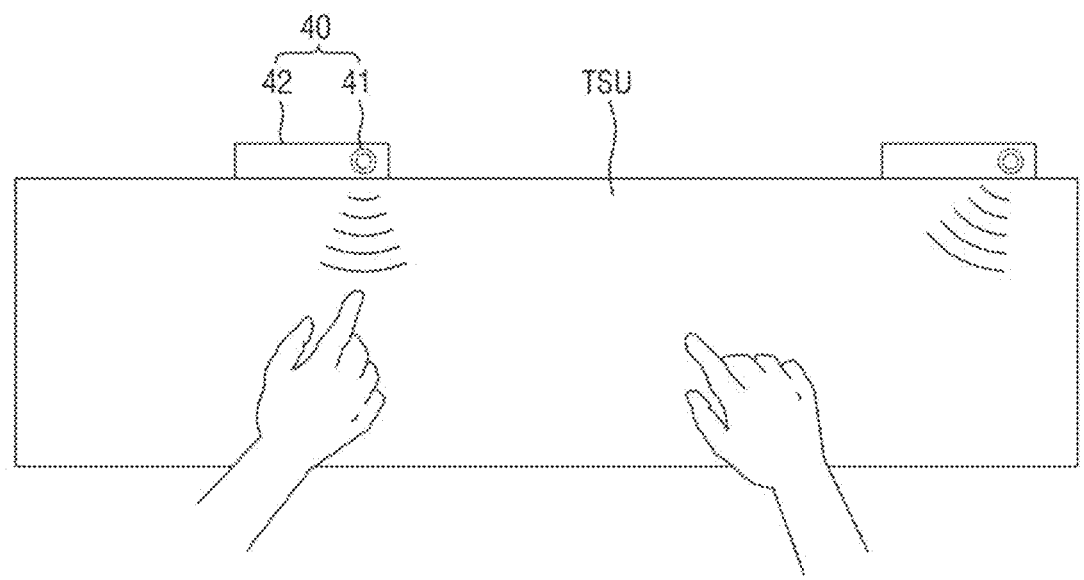
FIG. 8 illustrates a method of identifying and distinguishing users of the touch detection module using one or more motion detection modules.

FIG. 8 illustrates a method of identifying and distinguishing users of the touch detection module by using one or more motion detection modules 40.

Referring to FIG. 8, the motion detection sensor 41 of each motion detection module 40 detects the motion of first through $n^{th}$ users who touch the touch sensing unit TSU of the display panel 100 and generates a motion detection signal according to the motion detection direction and the detection result.

The sensor driving circuit unit 42 of each motion detection module 40 determines the touch direction and touch position of each of the first through $n^{th}$ users according to the motion detection direction and detection result of a motion detection signal generated through at least one motion detection sensor 41. Then, the sensor driving circuit unit 42 identifies an identification (ID) and a motion detection signal for each of the first through $n^{th}$ users according to the determination result, and the sensor driving circuit unit 42 transmits the identified ID and motion detection signal of each user to a motion detection driving circuit 500.

The motion detection driving circuit 500 stores, in real time, the ID and motion detection signal of each user received from the sensor driving circuit unit 42, and transmits and shares them to a touch driving circuit 400.

Figure 9:
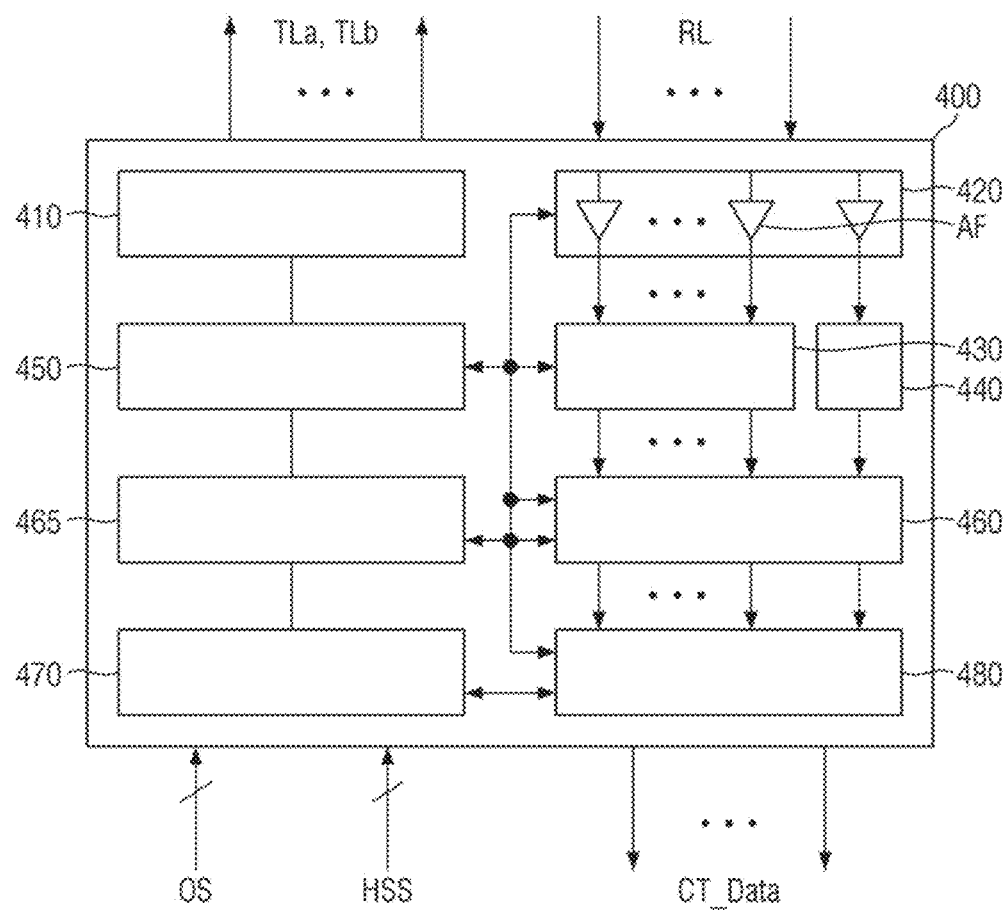
FIG. 9 is a detailed block diagram of a touch driving circuit illustrated in FIGS. 2 and 3.

FIG. 9 is a block diagram of a touch driving circuit 400 illustrated in FIGS. 2 and 3.

Referring to FIG. 9, the touch driving circuit 400 includes a driving signal output circuit 410, a sensing circuit unit 420 (or a sensing circuit), an analog-to-digital conversion (ADC) circuit 430, a current detection circuit 440, a touch driving control circuit 450, a user ID input circuit 470, a touch coordinate generation circuit 460, a touch user matching circuit 465, and a touch coordinate selection output circuit 480.

The driving signal output circuit 410 supplies touch driving signals to the driving electrodes TE of the touch sensing unit TSU through the first touch driving lines TLa and the second touch driving lines TLb. The driving signal output circuit 410 outputs touch driving signals to the driving electrodes TE ranging from the driving electrodes TE that are disposed on the leftmost side of the touch sensing area TSA to the driving electrode TE that are disposed on the rightmost side of the touch sensing area TSA in response to a touch driving control signal from the touch driving control circuit 450. For example, the touch driving signals may be supplied as a plurality of pulse signals generated at a level of about 1.8 V.

The sensing circuit unit 420 detects a change in charge of mutual capacitance of each of the touch nodes TN of the sensing electrodes RE of the touch sensing unit TSU through the touch sensing lines RL. The sensing circuit unit 420 may include operational amplifiers AF for detecting a change in charge of mutual capacitance of each of the touch nodes TN. The operational amplifiers AF may be connected one-to-one to the touch sensing lines RL.

The ADC circuit 430 sequentially converts output voltages of the touch sensing lines RL that are amplified by the operational amplifiers AF of the sensing circuit unit 420 into touch data which is digital data. For example, the output voltages of the touch sensing lines RL may be output voltages that are according to the change in charge of each of the touch nodes TN.

The current detection circuit 440 detects the amount of current from a test signal amplified through the operational amplifiers AF of the sensing circuit unit 420. The current detection circuit 440 may detect the amount of current by using a current detector, and the value of the detected current amount may be shared with the touch coordinate generation circuit 460.

The touch driving control circuit 450 controls the driving timing of the driving signal output circuit 410, the sensing circuit unit 420, the ADC circuit 430, and the current detection circuit 440. For example, the touch driving control circuit 450 sequentially supplies touch driving control signals for each group of driving electrodes TE to the driving signal output circuit 410 in each preset period to control the digital signal output circuit 410 to sequentially supply the touch driving signals to all driving electrodes TE in units of a preset number of groups.

The touch coordinate generation circuit 460 sequentially receives touch data from the ADC circuit 430. Then, the touch coordinate generation circuit 460 arranges the touch data according to the position of each touch electrode TE or RE and each touch node and compares size changes of the touch data. Here, touch position coordinate information CT_Data of a detected touch is calculated according to the change in size or difference value of the touch data arranged for each touch node.

The touch user matching circuit 465 detects, in real time, at least one current characteristic among the frequency, amplitude, pulse width, and current amount of a touch detection signal and compares the detected current characteristic with preset first through $n^{th}$ reference current characteristic information. The touch user matching circuit 465 identifies and specifies any one user who touched the touch sensing unit TSU among first through $n^{th}$ users according to the result of comparing the current characteristics of a touch detection signal detected in real time with the first through $n^{th}$ reference current characteristic information.

The user ID input circuit 470 receives a user ID OS and a motion detection signal HSS from a motion detection driving circuit 500 in real time. The user ID input circuit 470 identifies and specifies at least one user who touched the touch sensing unit TSU among the first through $n^{th}$ users based on the user ID OS and the motion detection signal HSS that are received from the motion detection driving circuit 500. For example, the user ID input circuit 470 may determine whether a plurality of users who simultaneously or successively touched the touch sensing unit TSU are the driver, who is the first user, or the front seat passenger, who is the $n^{th}$ user, based on the user ID OS and the motion detection signal HSS.

The touch coordinate selection output circuit 480 compares at least one user information identified and specified based on the ID OS and motion detection signal HSS for each of the first through $n^{th}$ users with at least one user information identified and specified by comparing the current and voltage characteristics of a touch detection signal with the first through $n^{th}$ reference current and voltage characteristic information. Then, the touch coordinate selection output circuit 480 calculates and selects the touch position coordinate information CT_Data for a user who matches the comparison result, and the touch coordinate selection output circuit 480 transmits the touch position coordinate information CT_Data to a display driving circuit 200 of the display panel 100.

The touch coordinate selection output circuit 480 may select or calculate touch coordinates of a user who made a touch input and may transmit the touch coordinates to the display driving circuit 200 only when a user (e.g., driver or passenger), who is identified and determined by comparing the current and voltage characteristics of a touch detection signal with the first through $n^{th}$ reference current and voltage characteristic information, matches a user (e.g., driver or passenger), who is identified and specified based on the ID OS and motion detection signal HSS for each user.

In addition, when a plurality of users (e.g., the driver and the front seat passenger) who simultaneously or successively touched the touch sensing unit TSU are identified as a result of comparing at least one user information, the touch coordinate selection output circuit 480 may calculate the touch position coordinate information CT_Data of only one of the identified users according to preset priority information (e.g., in the order of the driver, the front seat passenger, etc.) and transmit the calculated touch position coordinate information CT_Data to the display driving circuit 200.

As described above, a touch detection module and a display device including the same according to an embodiment of the present invention selectively control an image display operation according to a user (e.g., driver or front seat passenger) by distinguishing each of simultaneous users (e.g., driver or front seat passenger). Therefore, it is possible to prevent confusion (e.g., a failure in determining which operation should be performed in response to a touch input) and operation errors caused by user interference.

In addition, the touch detection module and the display device including the same according to an embodiment of the present invention can prevent a product malfunction and increase product use stability and reliability by controlling the image display operation according to the priority of each simultaneous user (e.g., driver or front seat passenger).

A touch detection module and a display device including the same according to an embodiment of the present invention may selectively control an image display operation according to a user by distinguishing each of simultaneous users. Therefore, it is possible to prevent confusion and operation errors caused by user interference.

In addition, the touch detection module and the display device including the same according to an embodiment of the present invention can prevent a product malfunction and increase product use stability and reliability by controlling the image display operation according to the priority of each simultaneous user.

However, the effects of the present invention are not restricted to the ones set forth herein. The above and other effects of the present invention will be apparent to one of ordinary skill in the art to which the present invention pertains.

While the present invention has been described with reference to the embodiments thereof, it will be understood by those of ordinary skill in the art that various changes in form and detail may be made thereto without departing from the spirit and scope of the present invention.

What is claimed is:

1. A touch detection circuit comprising:
a touch sensing unit comprising a plurality of driving electrodes and a plurality of sensing electrodes arranged to intersect the driving electrodes;
first through n-th unique signal generators transmitting first through n-th unique signals, which have different voltage or current characteristics, to bodies of first through n-th users, respectively;
at least one motion detection circuit detecting a touch direction and touch position of each of the first through n-th users; and
a touch driving circuit driving the driving electrodes and the sensing electrodes to detect touch detection signals and generate touch position coordinate information,
wherein the touch driving circuit selects any one user, of the first through n-th users, who performed a touch operation on the touch sensing unit according to a preset priority, and generates and outputs touch position coordinate information according to the touch position of the selected user,
wherein the touch driving circuit detects, in real time, at least one current and voltage characteristic of a touch detection signal, compares the detected current and voltage characteristic with preset first through n-th reference current and voltage characteristic information, and identifies and determines any one user, of the first through n-th users, who performed the touch operation according to the comparison result,
wherein the touch driving circuit identifies and specifies at least one user, among the first through n-th users, who touched the touch sensing unit based on each user's ID and motion detection signal received from the at least one motion detection circuit, compares at least one user information identified and specified based on each user's ID with at least one user information identified by comparing the detected current and voltage characteristics of the touch detection signal with the first through n-th reference current and voltage characteristic information, and calculates and selects touch position coordinate information for a user who matches the comparison result.

2. The touch detection circuit of claim 1, wherein the first through n-th unique signal generators are installed on contact members that are adjacent to the first through n-th users, respectively, generate the first through n-th unique signals as electrical signals which are different in at least one current and voltage characteristic among amplitude, pulse width, wavelength and frequency, and transmit the first through n-th unique signals to the bodies of the first through n-th users, respectively.

3. The touch detection circuit of claim 2, wherein the at least one motion detection circuit is installed on a display panel or a structure adjacent to the display panel, determines the touch direction and touch position of each of the first through n-th users according to motion detection directions and detection results of users who touch the touch sensing unit, and identifies and selects, from among identifications (IDs) of the first through n-th users, an ID and a motion detection signal of a user who performed a touch operation on the touch sensing unit according to the determination result.

4. The motion detection circuit of claim 3, wherein the at least one motion detection circuit comprises:
at least one motion detection sensor detecting motion of the first through n-th users; and a sensor driving circuit unit identifying a motion detection signal for each of the first through n-th users according to the touch direction and touch position of each of the first through n-th users, and selecting and transmitting an ID and motion detection signal of a user who performed a touch operation on the touch sensing unit according to the identification result.

5. The touch detection circuit of claim 3, wherein the touch driving circuit detects, in real time, at least one current and voltage characteristic among the frequency, pulse width, amplitude and current amount of a touch detection signal.

6. The touch detection circuit of claim 5, wherein the first through n-th reference current and voltage characteristic information comprises first through n-th reference frequency information, first through n-th reference pulse width information, and first through n-th reference current amount information.

7. The touch detection circuit of claim 5, wherein the touch driving circuit identifies and specifies any one user who performed the touch operation as a first user if the current and voltage characteristics of the touch detection signal are included in a range smaller than the first reference current and voltage characteristic information, identifies and specifies any one user who performed the touch operation as the second user if the current and voltage characteristics of the touch detection signal are included in a range equal to or greater than the first reference current and voltage characteristic information and smaller than the second reference current and voltage characteristic information, identifies and specifies any one user who performed the touch operation as the third user if the current and voltage characteristics of the touch detection signal are included in a range equal to or greater than the second reference current and voltage characteristic information and smaller than the third reference current and voltage characteristic information, and identifies and specifies any one user who performed the touch operation as the n-th user if the current and voltage characteristics of the touch detection signal are included in a range equal to or greater than the third reference current and voltage characteristic information and smaller than the n-th reference current and voltage characteristic information.

8. The touch detection circuit of claim 5, wherein the touch driving circuit transmits the calculated and selected touch position coordinate information to a display driving circuit of the display panel.

9. The touch detection circuit of claim 8, wherein the touch driving circuit calculates and selects the touch position coordinate information for the user and transmits the calculated and selected touch position coordinate information to the display driving circuit of the display panel only when at least one user information identified and specified based on each user's ID matches at least one user information identified by comparing the current and voltage characteristics of the touch detection signal.

10. The touch detection circuit of claim 9, wherein when a plurality of users who simultaneously or successively touched the touch sensing unit are identified as a result of comparing the at least one user information, the touch driving circuit selects any one of the identified users according to preset priority information, calculates touch position coordinate information for only the priority user, and transmits the calculated touch position coordinate information to the display driving circuit.

11. A display device comprising:
a display panel comprising a display area in which a plurality of pixels are arranged; and
a touch detection circuit disposed on the display panel and detecting a user's touch,
wherein the touch detection circuit comprises:
a touch sensing unit comprising a plurality of driving electrodes and a plurality of sensing electrodes arranged to intersect the driving electrodes;
first through n-th unique signal generators transmitting first through n-th unique signals, which have different voltage or current characteristics, to bodies of first through n-th users, respectively;
at least one motion detection circuit detecting a touch direction and touch position of each of the first through n-th users; and
a touch driving circuit driving the driving electrodes and the sensing electrodes to detect touch detection signals and generate touch position coordinate information,
wherein the touch driving circuit selects any one user, from the first through n-th users, who performed a touch operation on the touch sensing unit according to a preset priority, and generates and outputs touch position coordinate information according to the touch position of the selected user,
wherein the touch driving circuit detects, in real time, at least one current and voltage characteristic of a touch detection signal, compares the detected current and voltage characteristic with preset first through n-th reference current and voltage characteristic information, and identifies and determines any one user, of the first through n-th users, who performed the touch operation according to the comparison result,
wherein the touch driving circuit identifies and specifies at least one user, among the first through n-th users, who touched the touch sensing unit based on each user's ID and motion detection signal received from the at least one motion detection circuit, compares at least one user information identified and specified based on each user's ID with at least one user information identified by comparing the detected current and voltage characteristics of the touch detection signal with the first through n-th reference current and voltage characteristic information, and calculates and selects touch position coordinate information for a user who matches the comparison result.

12. The display device of claim 11, wherein the first through n-th unique signal generators are installed on contact members that are adjacent to the first through n-th users, respectively, generate the first through n-th unique signals as electrical signals which are different in at least one current and voltage characteristic among amplitude, pulse width, wavelength and frequency, and transmit the first through n-th unique signals to the bodies of the first through n-th users, respectively.

13. The display device of claim 12, wherein the at least one motion detection circuit is installed on a display panel displaying an image or a structure around the display panel, determines the touch direction and touch position of each of the first through n-th users according to motion detection directions and detection results of users who touch the touch sensing unit, and identifies and selects, from among IDs of the first through n-th users, an ID and a motion detection signal of a user who performed a touch operation on the touch sensing unit according to the determination result.

14. The display device of claim 13, wherein the touch driving circuit detects, in real time, at least one current and voltage characteristic among the frequency, pulse width, amplitude and current amount of a touch detection signal.

15. A touch sensing unit comprising:
a touch sensing unit comprising a plurality of driving electrodes and a plurality of sensing electrodes;
first through n-th unique signal generators transmitting first through n-th unique signals, which have different voltage or current characteristics, to bodies of first through n-th users, respectively;
at least one motion detection circuit detecting a touch direction and touch position of each of the first through n-th users who provide a touch input to the touch sensing unit; and
a touch driving circuit measure a change in capacitance of touch nodes that are formed between driving electrodes and the sensing electrodes and generate touch position coordinate information,
wherein the touch driving circuit selects any one user, of the first through n-th users, who provides a touch input on the touch sensing unit according to a preset priority, wherein the touch driving circuit detects a voltage and current characteristic of a touch detection signal in real time and compares the detected voltage and current characteristic with preset first through $n^{th}$ reference voltage and current characteristic information, and wherein the touch driving circuits identifies and determines any one user, among the first through $n^{th}$ users, who provided the touch input to the touch sensing unit according to the result of the comparison,
wherein the touch driving circuit identifies and specifies at least one user, among the first through n-th users, who touched the touch sensing unit based on each user's ID and motion detection signal received from the at least one motion detection circuit, compares at least one user information identified and specified based on each user's ID with at least one user information identified by comparing the detected current and voltage characteristics of the touch detection signal with the first through n-th reference current and voltage characteristic information, and calculates and selects touch position coordinate information for a user who matches the comparison result.

16. The touch detection circuit of claim 15, wherein the first through n-th reference current and voltage characteristic information comprises first through n-th reference frequency information, first through n-th reference pulse width information, and first through n-th reference current amount information.

17. The touch detection circuit of claim 15, wherein the touch driving circuit identifies and specifies any one user who provided the touch input as a first user if the current and voltage characteristic of the touch detection signal are included in a range smaller than the first reference current and voltage characteristic information, identifies and specifies any one user who provided the touch input as the second user if the current and voltage characteristic of the touch detection signal are included in a range equal to or greater than the first reference current and voltage characteristic information and smaller than the second reference current and voltage characteristic information, identifies and specifies any one user who provided the touch input as the third user if the current and voltage characteristic of the touch detection signal are included in a range equal to or greater than the second reference current and voltage characteristic information and smaller than the third reference current and voltage characteristic information, and identifies and specifies any one user who provided the touch input as the n-th user if the current and voltage characteristic of the touch detection signal are included in a range equal to or greater than the third reference current and voltage characteristic information and smaller than the n-th reference current and voltage characteristic information.

18. The touch detection circuit of claim 15, wherein the at least one motion detection circuit includes a motion detection sensor that detects the motion of each of the first through $n^{th}$ users who provides a touch input to the sensing unit and generates a motion detection signal according to motion detection direction and the detection result.

19. The touch detection circuit of claim 18, wherein the at least one motion detection circuit further includes a sensor driving circuit that determines the touch direction and the touch position of each of the first through $n^{th}$ user according to the motion detection direction and the detection result of the motion detection signal that are detected through the motion detection sensor.

20. An electronic device including a display device, wherein the display device comprising:
a display panel comprising a display area in which a plurality of pixels are arranged; and
a touch detection circuit disposed on the display panel and detecting a user's touch,
wherein the touch detection circuit comprises:
a touch sensing unit comprising a plurality of driving electrodes and a plurality of sensing electrodes arranged to intersect the driving electrodes;
first through n-th unique signal generators transmitting first through n-th unique signals, which have different voltage or current characteristics, to bodies of first through n-th users, respectively;
at least one motion detection circuit detecting a touch direction and touch position of each of the first through n-th users; and
a touch driving circuit driving the driving electrodes and the sensing electrodes to detect touch detection signals and generate touch position coordinate information,
wherein the touch driving circuit selects any one user, from the first through n-th users, who performed a touch operation on the touch sensing unit according to a preset priority, and generates and outputs touch position coordinate information according to the touch position of the selected user,
wherein the touch driving circuit detects, in real time, at least one current and voltage characteristic of a touch detection signal, compares the detected current and voltage characteristic with preset first through n-th reference current and voltage characteristic information, and identifies and determines any one user, of the first through n-th users, who performed the touch operation according to the comparison result,
wherein the touch driving circuit identifies and specifies at least one user, among the first through n-th users, who touched the touch sensing unit based on each user's ID and motion detection signal received from the at least one motion detection circuit, compares at least one user information identified and specified based on each user's ID with at least one user information identified by comparing the detected current and voltage characteristics of the touch detection signal with the first through n-th reference current and voltage characteristic information, and calculates and selects touch position coordinate information for a user who matches the comparison result.

* * * * *